(12) United States Patent
Holtz

(10) Patent No.: US 7,833,412 B2
(45) Date of Patent: Nov. 16, 2010

(54) STORMWATER TREATMENT SYSTEM WITH FLOW DISTRIBUTION OVERFLOW/BYPASS TRAY

(75) Inventor: James Ferguson Holtz, Portland, OR (US)

(73) Assignee: Americast, Inc., Ashland, VA (US)

( * ) Notice: Subject to any disclaimer, the term of this patent is extended or adjusted under 35 U.S.C. 154(b) by 86 days.

(21) Appl. No.: 12/379,338

(22) Filed: Feb. 19, 2009

(65) Prior Publication Data

US 2010/0206790 A1   Aug. 19, 2010

(51) Int. Cl.
*C02F 3/32* (2006.01)
(52) U.S. Cl. .................. 210/150; 210/170.03; 210/254; 210/291; 210/434
(58) Field of Classification Search .................. 210/150, 210/151, 162, 170.03, 254, 263, 291, 433.1, 210/434
See application file for complete search history.

(56) References Cited

U.S. PATENT DOCUMENTS

| | | | |
|---|---|---|---|
| 5,746,911 A * | 5/1998 | Pank | 210/170.03 |
| 6,077,448 A * | 6/2000 | Tran-Quoc-Nam et al. | 210/254 |
| 6,277,274 B1 | 8/2001 | Coffman | |
| 6,783,683 B2 * | 8/2004 | Collings | 210/170.03 |
| 7,022,243 B2 * | 4/2006 | Bryant | 210/170.03 |
| 7,425,261 B2 | 9/2008 | Siviter et al. | |
| 7,517,450 B2 * | 4/2009 | Hersey et al. | 210/434 |
| 2005/0103698 A1 * | 5/2005 | Eberly | 210/254 |
| 2009/0050583 A1 * | 2/2009 | Arnott et al. | 210/170.03 |
| 2009/0255868 A1 * | 10/2009 | Allen et al. | 210/151 |

OTHER PUBLICATIONS

Coffman et al., "An Advanced Sustainable Stormwater Treatment System", www.filterra.com.

* cited by examiner

*Primary Examiner*—Christopher Upton
(74) *Attorney, Agent, or Firm*—Jacobson Holman PLLC

(57) ABSTRACT

A stormwater treatment system, including a treatment container for treating stormwater through a bioretention mechanism. The treatment chamber includes an overflow/bypass system, including a flow distribution tray or flume that includes a distribution compartment or channel, an overflow dam or weir, and an overflow/bypass compartment. The stormwater distribution compartment or channel includes one or more openings for stormwater to be treated to fall onto the filter media located within the treatment container. When high flow rates are obtained that exceed the capacity of the unit, the overflow/bypass stormwater enters the overflow/bypass compartment where it is received by an overflow/bypass outlet pipe to be directed out of the container without such water being treated or further treated by the filter media.

15 Claims, 4 Drawing Sheets

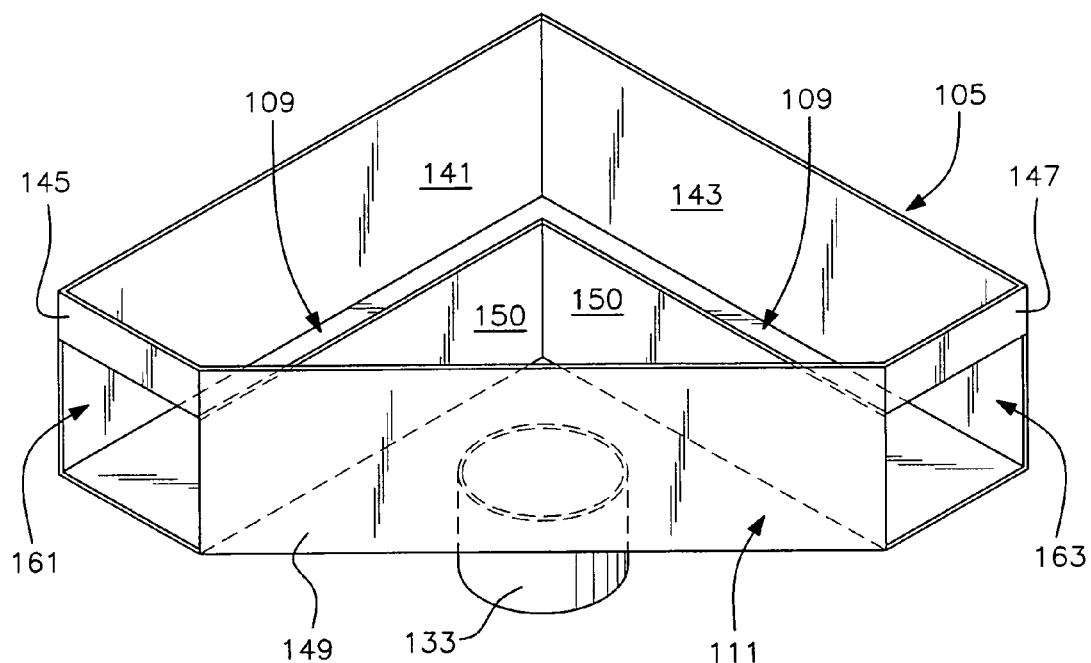
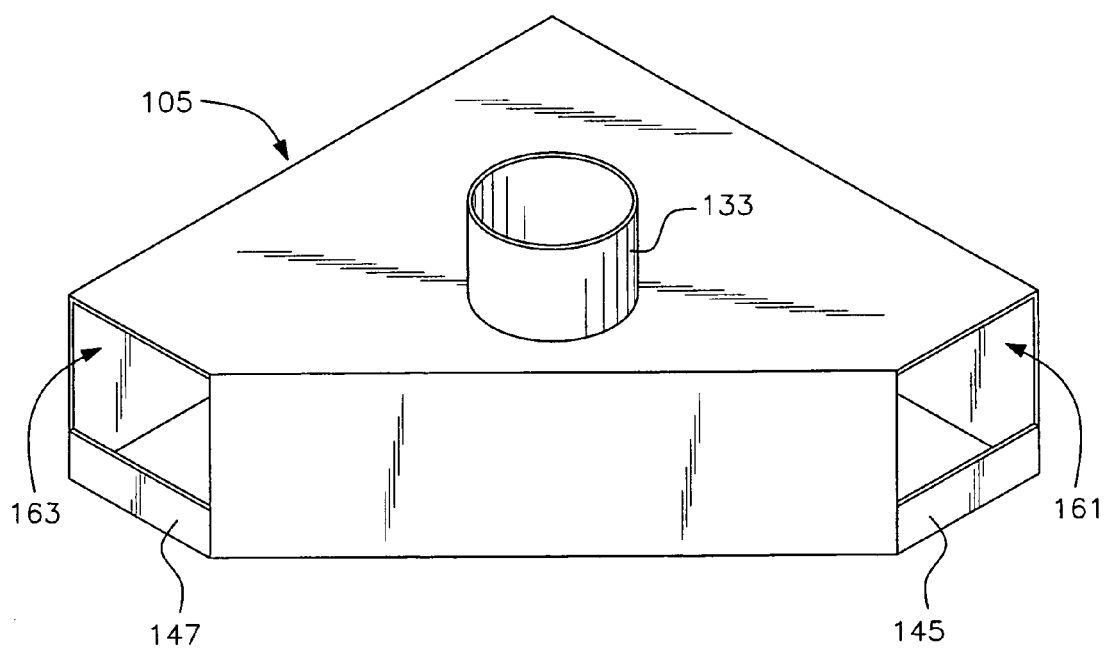

STORMWATER TREATMENT SYSTEM WITH FLOW DISTRIBUTION OVERFLOW/BYPASS TRAY

BACKGROUND OF THE INVENTION

1. Field of the Invention

A stormwater filtration system having overflow/bypass capability forms the subject of the present invention. The stormwater filtration system includes a treatment container with a filter media that treats stormwater runoff through bioretention. Bioretention is the filtering of stormwater runoff through a terrestrial aerobic plant/soil/microbe complex to capture, remove, and cycle pollutants. The container includes a flow distribution tray, or flume, that includes a stormwater distribution compartment, or channel, and an overflow/bypass compartment separated by a dam wall or weir. The container receives stormwater through an inlet, and includes an overflow/bypass outlet pipe, as well as an underdrain pipe. The underdrain pipe receives the treated stormwater that flows downwardly from the distribution compartment through the filter media. The overflow/bypass outlet pipe receives primarily untreated stormwater attributed to high stormwater flow rates from the overflow/bypass compartment. The stormwater filtration system is particularly appropriate for receiving stormwater from building roof drain structures, such as vertically oriented drainage pipes that interconnect with the inlet.

2. Description of the Related Art

Stormwater bioretention treatment systems are known in the art. Such systems are described in U.S. Pat. Nos. 6,277,274 and 6,569,321, exclusively licensed to the assignee of this application, and incorporated herein in their entirety by reference. Such systems have been commercialized by Americast, Inc. and marketed under the FILTERRA® trademark. Further details of the FILTERRA® system may be obtained from the Americast, Inc. website at www.filterra.com. There, an article entitled "An Advanced Sustainable Stormwater Treatment System" authored by Larry S. Coffman and Terry Siviter is available that further describes a prior art FILTERRA® system. The article is also incorporated by reference herein.

The prior FILTERRA® system includes a substantially water impermeable treatment container having an underdrain pipe embedded near the bottom of the container. The container contains filter media, including a layer of mulch overlying a soil mixture. Live plants grow in the filter media and extend out through a top opening. The container is positionable below ground (albeit could be at, or above ground level) and typically located adjacent a roadway or parking lot where flow can occur through a cutout in the curb or otherwise through the filter media. Stormwater runoff from the roadway collects pollutants which are treated in the container. The underdrain pipe is connected to an outlet that flows into the storm sewer drainage system or a separate or adjacent infiltration system, either directly or first through a catch basin.

Stormwater runoff from building roof drains also results in stormwater pollution problems. Stormwater runoff from the roofs of buildings is drained through downspouts or through vertically oriented pipe systems directly into the ground where the pollutants can seep into the ground without treatment. A need has thus arisen for treating the stormwater runoff from building roofs.

Treatment of stormwater runoff at high flow rates also poses a problem. When the flow rates are high, in excess of the capacity of the stormwater treatment container, the excess capacities will simply overflow the treatment container. Thus, a need has arisen to permit high stormwater runoff to overflow or bypass the treatment container filtration media in a controlled manner.

One such solution for treating runoff from building roof drains and for treating high stormwater runoffs is described in commonly-owned U.S. Pat. No. 7,425,261, issued on Sep. 16, 2008, based on patent application Ser. No. 11/417,220, published as US 2007/0256966 A1 on Nov. 8, 2007.

SUMMARY OF THE INVENTION

The present invention relates to a stormwater treatment system including a stormwater treatment container with bioretention capability. The stormwater treatment container includes a container having a bottom, sidewall(s), and a top at least partially open to the atmosphere. The top may include a slab of water impermeable material having a substantially central opening through which plant material grows, as well as an inlet opening for receiving stormwater to be treated. The container includes filter media that may include a layer of mulch overlying a soil mixture that includes a combination of organic and non-organic material that supports the growth of live plant material in the filter media. Embedded within the media is an underdrain pipe that receives the treated stormwater as it seeps through the media toward the bottom of the container. Treated stormwater passes through the underdrain pipe, through an underdrain pipe opening in the sidewall or bottom to a storm drain or sewer system or other type of discharge system or method. The treatment container may be positionable below, at, or above ground level.

The present invention also includes a bypass or overflow outlet pipe that may also lead to the storm drain or sewer system or other type of discharge system or method. Stormwater that enters the container at high flow rates in excess of container treatment capacity can overflow or bypass the filter media and exit through the overflow/bypass outlet pipe without being treated, or fully treated by, the filter media. The term(s) "overflow/bypass" or "overflow/bypass outlet pipe" are defined broadly to encompass a condition where high inlet stormwater flows that are in excess of the capacity of the treatment container to treat the stormwater will result in some of the stormwater to bypass the filter media entirely or permit some of the treated stormwater or partially treated stormwater to overflow the media. (That is, the water that flows out of the outlet pipe opening may be a combination of both bypass, overflow, or may be only one of the two conditions.)

Preferably, stormwater enters the container through an inlet and falls onto a flow distribution tray that is connected to the container side wall. The flow distribution tray includes a stormwater distribution channel or compartment that receives this untreated stormwater from the stormwater inlet and channels the stormwater through one or more openings into the container interior. The stormwater falls on and then through the filter media and is thus treated by the filter media. The flow distribution tray also includes an overflow/bypass compartment, defined by a dam wall or weir wall, that connects with an overflow/bypass outlet pipe. When the stormwater flows are high and in excess of the capacity to be treated by the filter media, the overflow/bypass overflows the dam and falls into the overflow/bypass compartment and, in turn, through the overflow/bypass outlet pipe. The overflow/bypass outlet pipe is connected to an opening through the container bottom or side walls to exit the container without further passing through the filter media.

It is an object of the present invention to provide a stormwater bioretention treatment container having the capability of enabling stormwater entering at high flow rates in excess of treatment capacity to overflow or bypass the filtration media. It is further an object of the present invention to provide a stormwater bioretention treatment chamber, including a stormwater inlet to receive stormwater from the roof of a building.

Still further, it is an object of the present invention to have a stormwater treatment chamber with bioretention capability wherein the stormwater to be treated first flows onto a flow distribution tray prior to falling onto the filter media. The flow distribution tray includes a first stormwater distribution compartment where normal flow rates will pass through openings and onto the filter media. The tray includes a dam wall or weir wall that defines an overflow/bypass compartment that receives untreated or partially treated stormwater that, at high flow rates, overflows the stormwater distribution compartment into the overflow/bypass compartment and through an overflow/bypass outlet pipe connected to the compartment to then exit out of the container without such untreated or partially treated water further passing through the filter media.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an isometric perspective view of the flow distribution tray from the top;

FIG. 5 is an isometric perspective view of the flow distribution tray from the bottom;

DETAILED DESCRIPTION OF THE PREFERRED EMBODIMENTS

Figure 1:
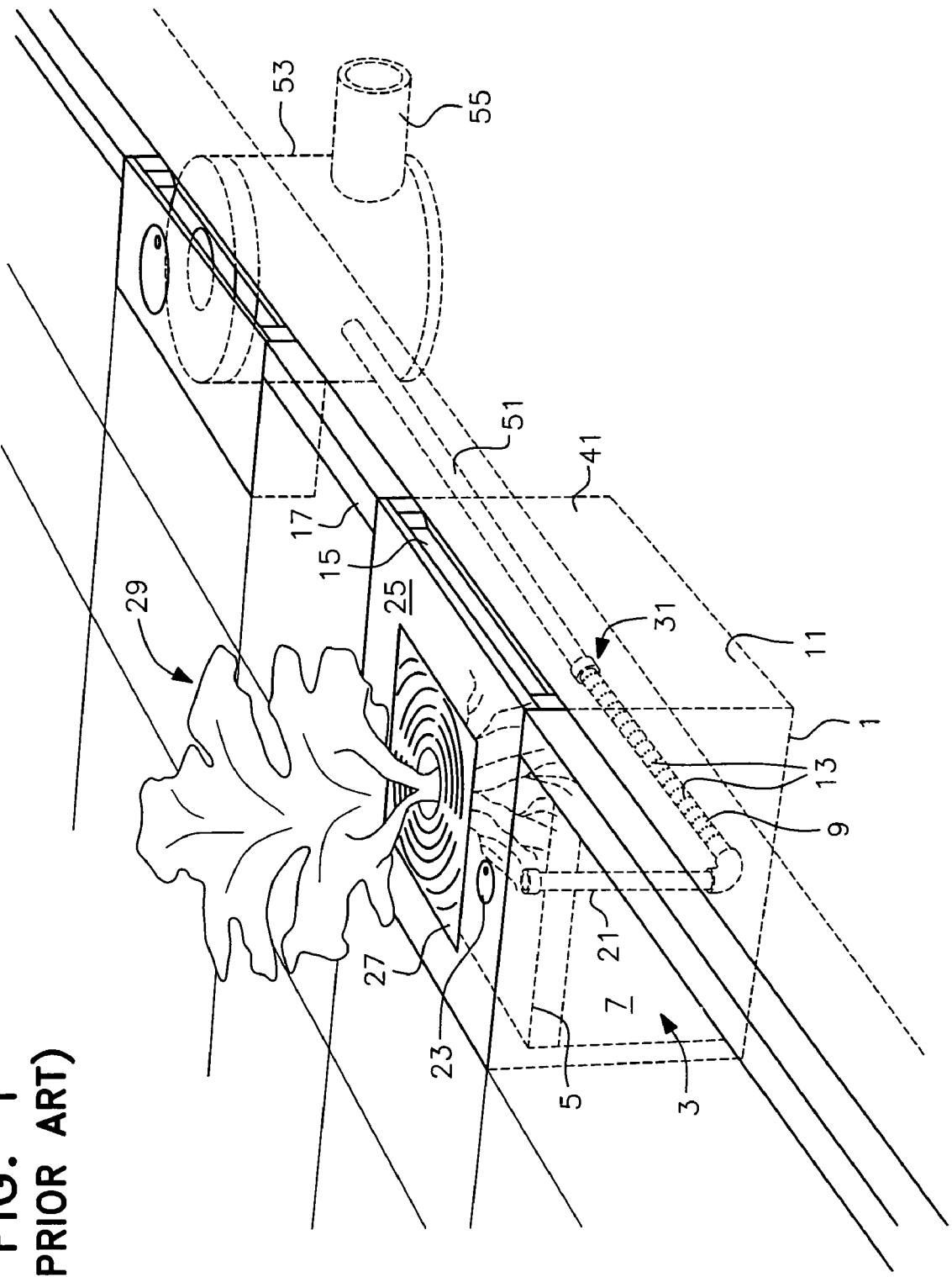
FIG. 1 is a perspective view of a prior art stormwater bioretention filtration system.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
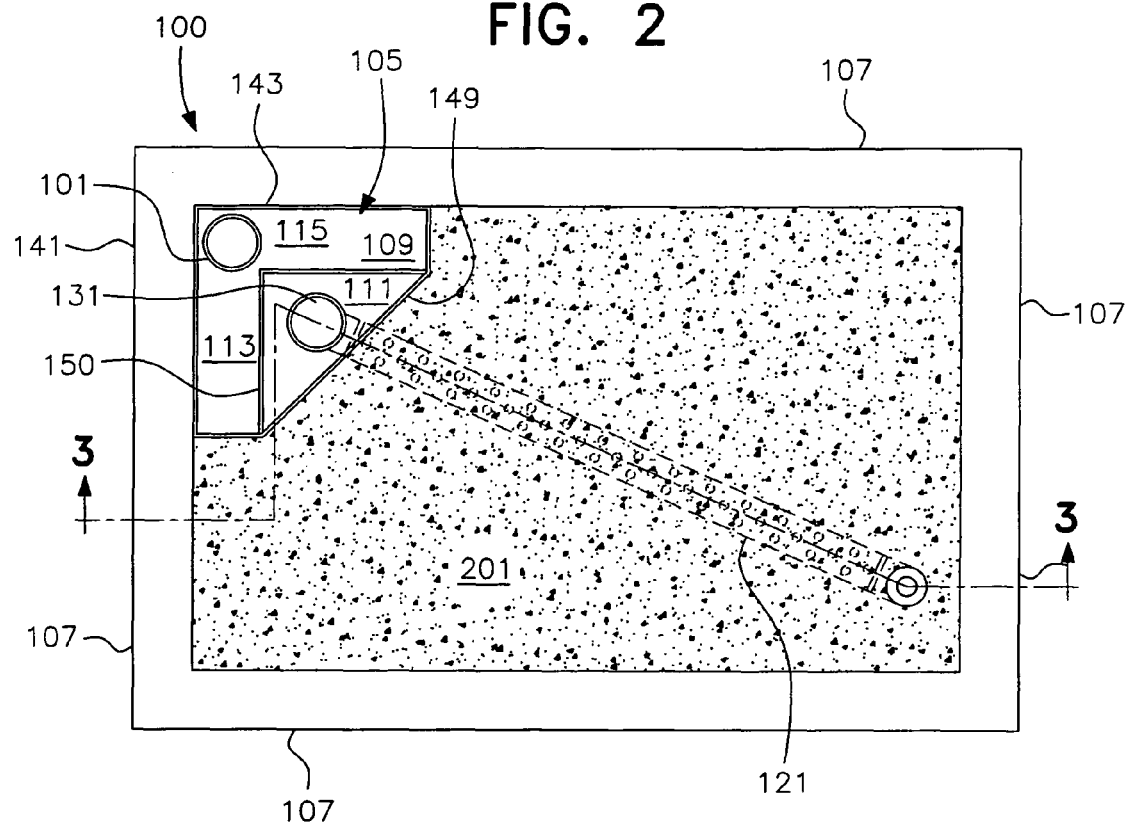
FIG. 2 is a top view of the stormwater treatment container of the present invention without the top slab.
Figure 6:
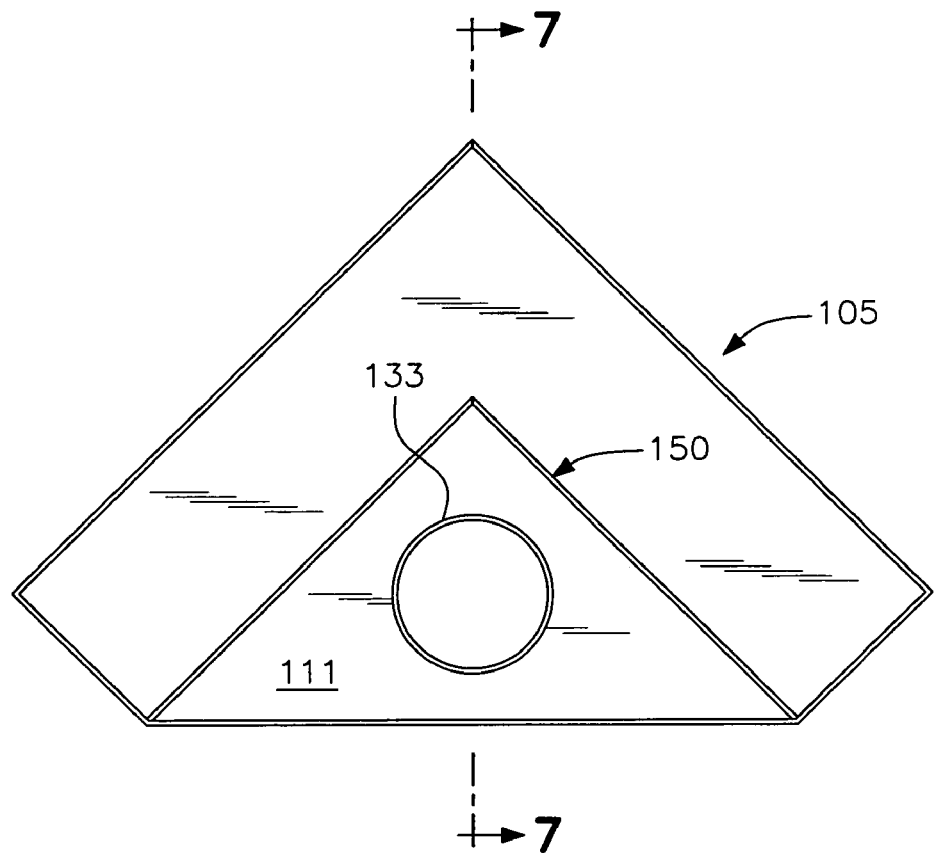
FIG. 6 is a top view of the flow distribution tray.
Figure 7:
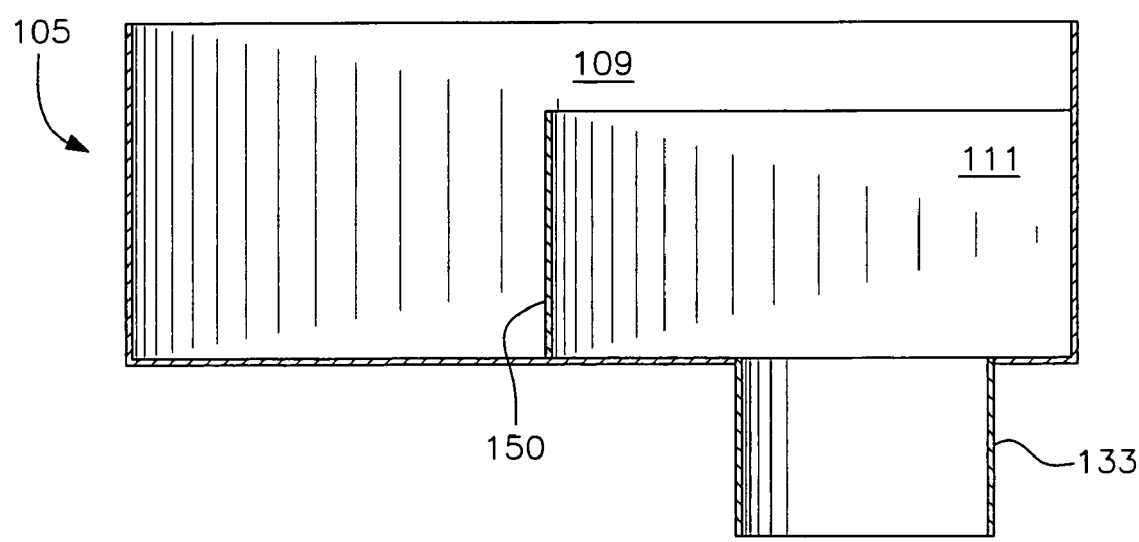
FIG. 7 is a cross-sectional view along line 7-7 of FIG. 6.

Referring now to the drawings and, specifically, FIG. 1, a prior art stormwater bioretention filtration system of the type disclosed in U.S. Pat. Nos. 6,277,274 and 6,569,321 (FIGS. 2 and 6, specifically) is depicted (hereinafter, the "Coffman patents"). This prior art system has been commercialized as the FILTERRA® stormwater bioretention filtration system by Americast, Inc. The prior art system includes a substantially water impermeable container 1, preferably of concrete, which holds filter media 3, including a mulch layer 5 overlying soil mixture 7 of the type described in the Coffman patents incorporated by reference herein. A stormwater underdrain pipe 9 is provided adjacent the bottom 11 having a plurality of openings 13 that receive the stormwater as it is filtered through the media. Incoming stormwater flows through, in this example, a cutout 15 in a curb 17 adjacent a roadway and the stormwater seeps through the filter media 3 into the underdrain pipe 9. Associated with the underdrain pipe 9 is a vertical clean-out pipe 21 (as described in the Coffman patents) that is accessible through a clean-out plate 23 positioned in the top slab 25 of the treatment container 1. The clean-out pipe is optional. Located substantially centrally in the top slab 25 is a tree grate 27 through which plant material, such as a plant or tree 29, can grow therethrough. The plant material 29, along with the filter media 7 that preferably comprises a non-organic matrix material and an organic matrix material including topsoil, provides for the filtering of the stormwater runoff to capture, remove and cycle pollutants through a variety of physical, chemical and biological processes as described in the Coffman patents incorporated by reference herein, as well as in the publication "An Advanced Sustainable Stormwater Treatment System" authored by Coffman et al., as found on the website www.filterra.com also incorporated by reference herein.

As shown in FIG. 1, the underdrain pipe 9 is connected through an underdrain pipe opening 31 in a side wall 41 to a drainpipe 51 that, in the example depicted, goes to a separate catch basin 53 prior to entering the storm drainpipe or sewer pipe 55. The use of a catch basin is optional. No bypass or overflow line is provided out of the container. When high stormwater flows are received, the high flow will merely pass on the street level into the catch basin 53 from the street.

The concrete container 1 and treatment media 7 as shown in FIG. 1 are below grade with the only features visible being the concrete top slab 25, the tree grate 27, the plant 29, and inlet opening 15 off of the curb 17.

The commercial FILTERRA® container size may vary from 4'×6' to 6'×12'. The mulch layer is typically 3" and the soil mixture height is typically 1.5' to 3.5'.

Overflow/bypass arrangements for the FILTERRA® stormwater bioretention filtration system are also disclosed in the prior art and are described in published patent application US 2007/02569966 A1, subsequently issued as U.S. Pat. No. 7,425,261 (hereinafter "the '261 patent"). Several systems for treating high flow rates and allowing such high flow rates to overflow/bypass the filter media are described.

The present invention is distinguished by an overflow/bypass arrangement to be described. The present invention has particular utility when utilized with a building roof drain structure wherein stormwater from the roof is directed down a vertical downspout (see FIG. 2 of the '261 patent) into an inlet pipe 101 and into the stormwater bioretention treatment chamber 100 of the present invention. The inlet pipe 101 is typically a vertical pipe that enters into the treatment container 100 through the top and, when the top includes a top slab 103 (shown schematically in FIG. 3), the vertical inlet pipe 101 extends through the top slab 103. The inlet pipe 101 opens above a stormwater flow distribution tray 105 that is disposed at a corner of the container side walls 107, which stormwater distribution tray 105 is divided into a stormwater distribution compartment 109 and an overflow/bypass compartment 111. The tray 105 is preferably open at the top, but may include a screen or protective lid. The lid may be vented. The stormwater distribution compartment 109 includes channels 113, 115 that open to deposit the stormwater onto the top of the filter media 201. The treated stormwater is received by an underdrain pipe 121 through perforations in the pipe and the treated stormwater exits through the bottom wall 120 and through the overflow/bypass pipe 131. It should be realized that the underdrain pipe 121 could exit the sidewalls 107 and could be separate from the pipe 131. The treated stormwater (as well as water through the overflow/bypass pipe 131) goes to the storm sewer system or through additional catch basins.

The overflow/bypass compartment 111 has a down stub section 133 that interconnects with the overflow/bypass outlet pipe 131 that exits the container. The opening to the down stub may be protected by a permanent or removable screen. The overflow/bypass outlet pipe 131, as shown, interconnects with the underdrain pipe 121 or could exit the container at a separate outlet opening. The exit could be through the bottom of the container or through the container sidewalls. The underdrain pipe 121, as is known in the art, may be connected to a vertical clean-out pipe 128 that allows access to the underdrain system by a conventional snake mechanism to clean out the underdrain system. A separate plate (not shown) may be provided in the top slab 103 for access to the clean-out pipe 121. The clean-out pipe is optional.

In the depicted preferred embodiment, the container side wall(s) 107 and bottom wall 121 are free of openings. Although the container is preferably water impermeable, it should be understood that the bottom wall, for example, could have openings and, indeed, could be entirely open. The side walls could also include some openings, including openings to allow tree roots to escape. Still further, the bottom wall could be formed from a plastic sheeting. The container may be positionable below, at, or above ground level.

Figure 3:
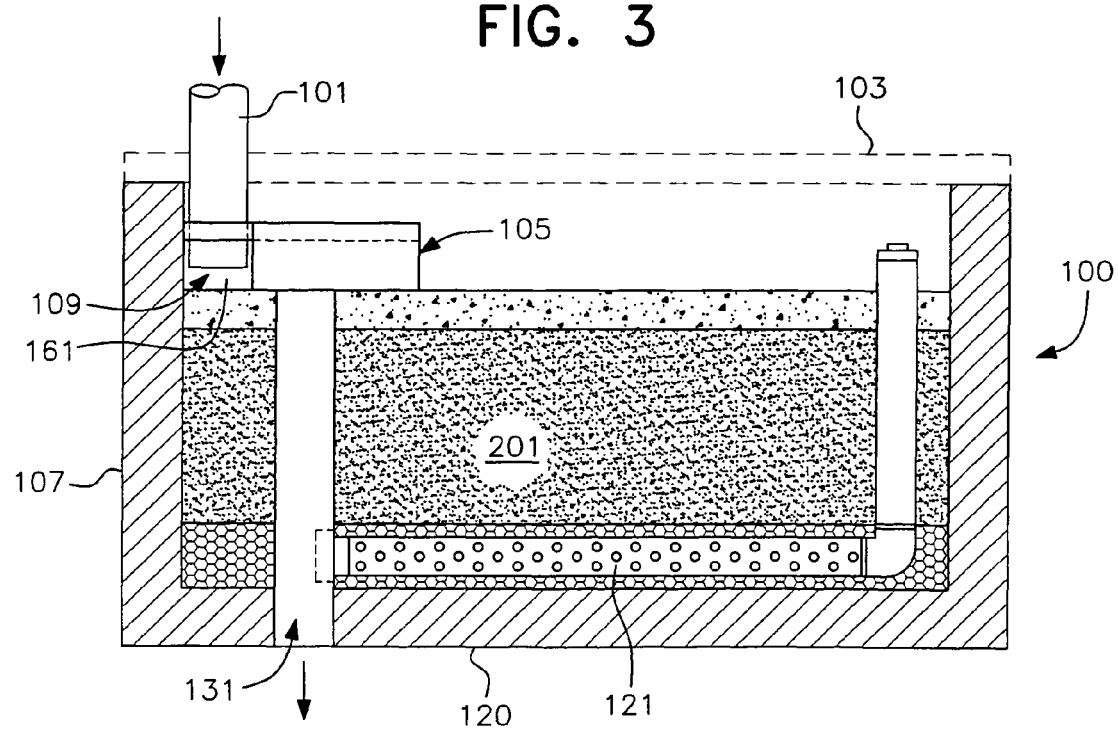
FIG. 3 is a cross-sectional view along line 3-3 of FIG. 2 with the top slab shown schematically.

The flow distribution and overflow system will now be described in greater detail. The flow distribution and overflow system includes a flow distribution tray or flume 105 designed to distribute flow to minimize turbulence and scour. As depicted in FIG. 3, the tray 105 appears aligned with the top of the filter media mulch, but this is not to scale. It is important only that the tray be vertically above the media so that stormwater entering the tray falls on the media. The flume or flow distribution tray 105 comprises distribution channels 113, 115 that define a compartment 109 and an overflow/bypass compartment 111 defined by the sidewalls 141, 143 of the tray and a dam wall, i.e., weir wall 150, that divides the flow distribution tray 105 into the two compartments 109, 111. The inlet pipe 101 outlet is positioned over the distribution compartment 109. A pair of openings 161, 163 are defined by the walls 141, 143 and walls 145, 147 and the overflow dam 150. Stormwater to be treated flows into the stormwater distribution compartment 109 and is channeled or directed through the openings 161, 163 to fall upon the filter media 201 where it is treated before entry into the underdrain pipe 121.

When the capacity of the treatment container 100 is exceeded, that is at high flow rates, water will begin to pond over the treatment media surface. When the ponding depth in the treatment system exceeds the height of the dam wall 150, flow will crest the overflow/bypass dam 150 to enter the overflow/bypass compartment 111 where the overflow is directed to the overflow/bypass outlet pipe 131. The overflow/bypass outlet pipe 131 carries the untreated bypass out of the unit without it being further passed through the filter media 201.

The flow distribution tray 105 may be a unit formed from 14-gauge stainless steel, although plastic, aluminum or other steels may be used. The height of the walls 141, 143, including angled wall 149 and end walls 145, 147, could be 8 inches and the height of the dam or weir wall 150 could be 6 inches. The two outlets 161, 163 are six-inch by seven-inch rectangular openings in this particular embodiment. The capacity of the stormwater distribution compartment 109 is 0.5 cubic feet per second and the capacity of the overflow/bypass compartment 111 may also be 0.5 cubic feet per second. These dimensions are only examples and the dimensions can be modified depending upon the capacity of the treatment chamber and bypass flow rates desired. The unit can be used in any treatment systems so long as the hydraulic capacities are not exceeded.

The flow distribution tray 105 may be bolted (through bolts not shown) into the corner of the container 100 at the container surface adjacent the top of the container. Bolt holes (not shown) may be located on the two long sides of the unit and bolts with washers may be passed through the holes to affix the unit to the side of the container. As shown, the sidewalls 141, 143 are at right angles to each other so as to fit within the corner of the container 100. Of course, if the container is circular in cross-section, the distribution tray 105 would have a circular sidewall instead of right-angle walls 141, 143 to fit within the container.

The dam wall or weir 150 has a height less than the sidewalls 141, 143, 145, 147, 149 of the tray 105. As is depicted, the dam wall 150 is formed as two right-angled walls. However, it should be appreciated that the dam wall may be contoured so that the joining of the two dam wall sides is defined by a curved wall.

To summarize, when stormwater flow rates are high, i.e., exceed the capacity of the treatment chamber to treat the stormwater, the level of the stormwater in the treatment chamber will rise and, at a certain point, will rise to the level of the dam wall or weir and, as it rises further, the water will overflow or bypass the dam wall to enter into the overflow/bypass compartment where such untreated or partially treated stormwater will then pass into the overflow/bypass pipe to be directed out of the container without such overflow passing through or further passing through the filter media. The exiting stormwater will be connected to the storm sewer system.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A stormwater treatment system comprising a treatment container having a sidewall defining a bottom, and at least a partially open top, said sidewall, bottom, and top defining a container interior, said container interior receiving a filter media including a soil mixture of organic and non-organic material for treating stormwater that may pass through the filter media, an underdrain pipe located within the filter media in proximity to said bottom and exiting said container through an opening in said container, said underdrain pipe including perforations to receive treated stormwater, a stormwater inlet for receiving untreated stormwater, an overflow/bypass outlet pipe for receiving at least partially untreated stormwater, and a flow distribution tray connected with the container sidewall comprising a stormwater distribution compartment for receiving untreated stormwater from said stormwater inlet and defining one or more openings that are in fluid communication with the filter media within the container interior, said flow distribution tray further comprising a stormwater overflow/bypass compartment for receiving at least partially untreated stormwater overflow from said stormwater distribution compartment and in fluid communication with said overflow/bypass outlet pipe, whereby the stormwater overflow within said stormwater overflow/bypass pipe is directed out of said container without passing through said filter media.

2. The stormwater treatment system of claim 1, wherein said flow distribution tray includes tray sidewalls, a tray bottom wall, and a dam wall that extends between tray sidewalls to divide the flow distribution tray between the stormwater distribution compartment and stormwater overflow/bypass compartment.

3. The stormwater treatment system of claim 2, wherein said dam wall height is less than the height of said tray sidewalls.

4. The stormwater treatment system of claim 3, wherein said one or more openings defined by said stormwater inlet compartment are located in said tray sidewalls.

5. The stormwater treatment system of claim 4, wherein said flow distribution tray, including said tray sidewalls, one or more openings, and dam wall, are sized such that untreated stormwater that is received through said stormwater inlet at flow rates higher than can be passed through said one or more openings into the filter media, will overflow the dam wall into said stormwater overflow/bypass compartment and enter said overflow/bypass pipe.

6. The stormwater treatment system of claim 4, wherein said one or more openings are substantially rectangularly shaped and extend from said trap bottom wall to a height substantially equal to the height of said dam wall.

7. The stormwater treatment system of claim 4, wherein said stormwater inlet comprises a stormwater inlet pipe having an outlet opening for directing untreated stormwater into said stormwater inlet compartment.

8. The stormwater treatment system of claim 7, wherein said stormwater overflow/bypass pipe is in fluid communication with said overflow/bypass compartment through an opening in the tray bottom wall of said overflow/bypass compartment.

9. The stormwater treatment system of claim 8, wherein said container bottom is substantially water impermeable and wherein said stormwater overflow/bypass pipe extends through said container bottom.

10. The stormwater treatment system of claim 7, wherein said stormwater inlet pipe is connectable to a roof drain structure that receives stormwater from a roof of a building.

11. The stormwater treatment system of claim 1, wherein said treatment container is positionable below ground level with said at least partially open top in communication with the atmosphere, and wherein said filter media further comprises a layer of mulch overlying said soil mixture and includes live plant material growing in the filter media, said plant material capable of growing out through the top of the container above ground level.

12. The stormwater treatment system of claim 11, wherein said partially open top includes a substantially water impermeable top slab defining an opening with a grate mounted therein through which the plant material grows out.

13. A stormwater treatment system comprising a treatment container having a side wall, at least a partially closed bottom wall, and at least a partially open top to define a container interior, said treatment container positionable below, at, or above ground level with said partially open top in communication with the atmosphere, said container interior including a filter media comprising a soil mixture of non-organic and organic material and capable of supporting live plant material growing in the filter media, said plant material capable of growing out through the top of the container above ground level, an underdrain pipe located substantially horizontally in proximity to said bottom wall and exiting said container through an underdrain pipe opening in one of said side or bottom walls, said underdrain pipe including a plurality of perforations to receive treated stormwater, a stormwater inlet for receiving stormwater to be treated, an overflow/bypass outlet pipe communicating through an outlet pipe opening in one of said side or bottom walls of said treatment container, said overflow/bypass outlet pipe for receiving at least partially untreated stormwater that flows through said stormwater inlet opening at rates in excess of that capable of treatment within said container, a flow distribution tray within said container and located below the position of said stormwater inlet and above the filter media to receive stormwater flowing through said stormwater inlet, said flow distribution tray comprising a stormwater distribution compartment for receiving untreated stormwater from said stormwater inlet and defining one or more openings that are in fluid communication with the filter media within the container interior, said flow distribution tray further comprising a stormwater overflow/bypass compartment for receiving at least partially untreated stormwater overflow from said stormwater distribution compartment and in fluid communication with said overflow/bypass outlet pipe, whereby the stormwater overflow within said stormwater overflow/bypass pipe is directed out of said container without passing through said filter media.

14. The stormwater treatment system of claim 13, wherein said flow distribution tray includes tray sidewalls, a tray bottom wall, and a dam wall that extends between tray sidewalls to divide the flow distribution tray between the stormwater distribution compartment and stormwater overflow/bypass compartment.

15. The stormwater treatment system of claim 14, wherein said dam wall height is less than the height of said tray sidewalls.

* * * * *